Patented July 22, 1924.

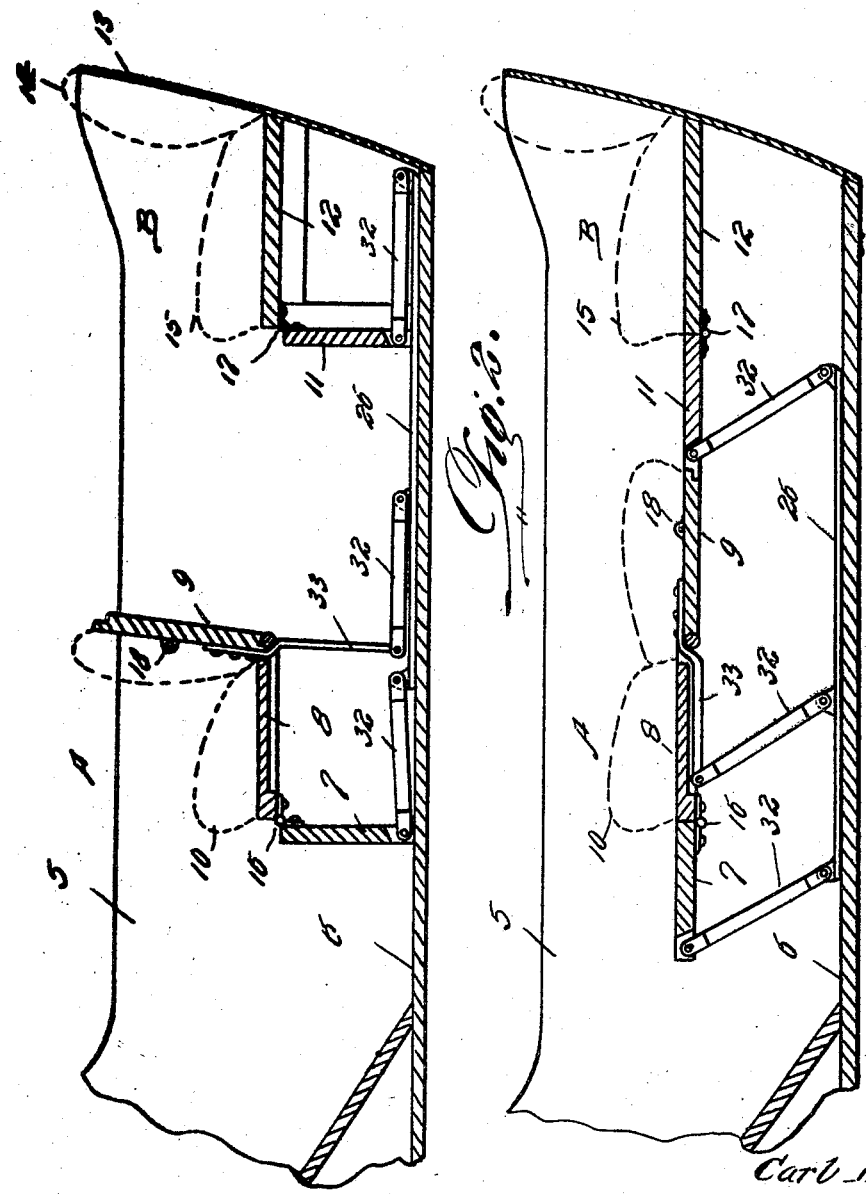

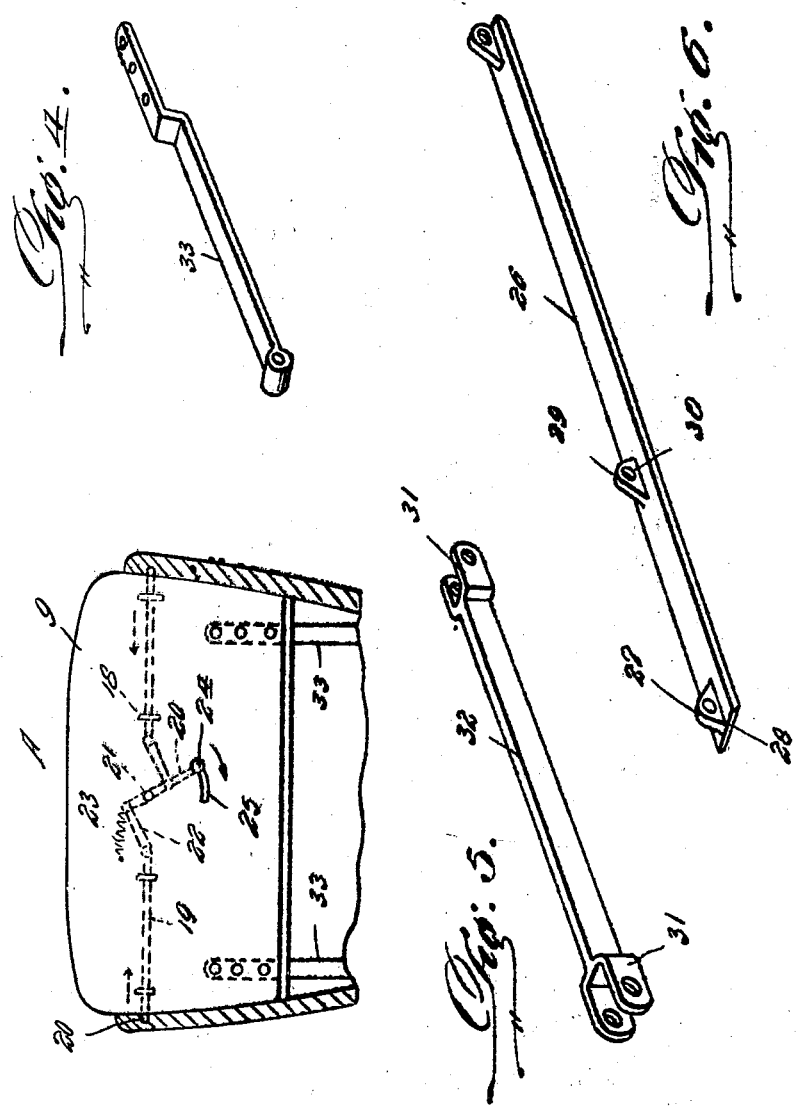

1,502,250

UNITED STATES PATENT OFFICE.

CARL HURST, OF GLENWOOD, IOWA.

AUTOMOBILE SEATING ARRANGEMENT.

Application filed April 13, 1923. Serial No. 631,779.

*To all whom it may concern:*

Be it known that CARL HURST, a citizen of the United States, residing at Glenwood, in the county of Mills and State of Iowa, has invented certain new and useful Improvements in Automobile Seating Arrangements, of which the following is a specification.

In carrying out the present invention it is my purpose to provide a seating arrangement for automobiles wherein the front and rear seats of the vehicle may be extended to a position for providing a bed or couch for obvious purposes.

A further purpose of the invention is the provision of such a seating arrangement for vehicles wherein the back rest of the front seat may be swung rearwardly to a plane parallel to the said portion of the front and back seats and at the same time the usual foot boards of the front and back seats are also extended to a position parallel with the seat portions.

A still further purpose of the invention is the provision of such a seat arrangement that may be installed in practically all types of motor vehicles, the same being relatively simple of construction, inexpensive of installation and highly efficient for the purposes intended.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 1 is a fragmentary longitudinal cross sectional view through a vehicle body equipped with my improved seating arrangement;

Figure 2 is a similar view of the seating arrangement extended to a position for providing a bed or couch;

Figure 3 is a fragmentary cross section through the vehicle body between the front and rear sides thereof for more clearly disclosing the locking means for retaining the back of the front seat in a relatively vertical position; and Figures 4, 5 and 6 are perspectives of certain elements comprised in my invention and hereinafter more specifically referred to.

Having particular reference to the drawings, 5 indicates a vehicle body and 6 the floor board thereof. A designates generally the front seat while B designates generally the rear seat. The front seat A comprises a heel board 7, seat board 8 and back rest 9, it being, of course, apparent that upon the seat board 8 and back rest 9 are the usual cushions 10.

The rear seat B comprises a heel board 11, a seat board 12 and back rest 13, the back rest in this instance comprising the rear end of the body 5, there being secured to this back 13 the usual cushion 14, it being of course understood that the seat board 12 includes a cushion 15.

The heel board 7 of the front seat A is hingedly secured at 16 to the front edge of the seat board 8 while the heel board 11 of the rear seat B is also hingedly secured at 17 to the seat board 12. The back rest 9 of the front seat is pivoted between the sides of the body 5 and adapted to be swung to a position parallel with the seat boards 8 and 12 of the seats A and B respectively in a manner presently to be set forth.

Slidable within brackets 18 upon the front side of the back rest 9 and at opposite ends thereof are horizontal rods 19, the ends of the same adapted for engagement within notches 20 upon the sides of the body 5 for maintaining the back rest 9 in its normally vertical position. Pivoted at 21 substantially centrally between the said rods 19 is a lever 22, this lever being connected upon opposite sides of its pivot to the rods 19 through the instrumentality of links 22. A coil spring 23 is provided for normally forcing the rods 19 outwardly for engaging the ends of the same within the said notches 20 of the vehicle body 5. One end of the lever 20 is provided with a rearwardly directed handle portion 24 movable within an arcuate slot 25 of the seat back 9, the purpose of the same being for disengaging the ends of the rods from the said notches for permitting of the downward swinging movement of the back rest.

Slidable upon the floor board 6 and adjacent opposite sides thereof are flatlike bars 26 more clearly shown in Figure 6. The opposite ends of these bars have formed thereon vertically extending ears 27 through which are openings 28. Also formed upon these bars and at a point spaced from the ears 27 upon the front ends thereof are additional ears 29 also provided with openings 30. Pivotally connected at their opposite yoked ends 31 between the heel boards 7 and 11 and the said ears 27 upon opposite ends of the rods 26 are forwardly directed links 32.

Upon the front side of the back rest 9 of the seat A and at opposite ends thereof are secured pendant arms 33, the same extending between the said back rest and the seat board 8 and being connected to the ears 29 of the flatlike bars 26 through the instrumentality of links similar in all respects to the link connections between the bars and said heel boards.

The edges of the heel boards 7 and 11 at the points of connection with the links are preferably channeled for facilitating their free swinging movement while the under surface of the seat board 8 of the front seat A is also channeled for receiving the arms 33 when the back rest 9 is swung to the position of Figure 2.

In view of the above description it will at once be apparent that when the rods 19 are released from the notches and the sides of the body 5 this back rest may be swung downwardly which through its connections to the flatlike rods 26 will occasion a forward sliding movement of these rods for consequently swinging the heel boards 7 and 11 into a position parallel to the seat boards 8 and 12 as well as the back rest 9 for providing a bed or couch, it of course being obvious that additional cushions or pillows may be used for filling up the space between the cushions of the seats A and B.

Although I have herein shown and described the preferred embodiment of the present invention, it is nevertheless to be understood that minor changes may be made therein, without departing from the spirit and scope of the invention as claimed.

Having thus described my invention, what I claim as new and desire to secure by Letters Patent is:

A convertible automobile seat structure comprising a front and a rear seat, fixed in spaced relation in the body of the automobile, bars mounted for sliding movement upon the floor of the body, and disposed longitudinally of the seats, heel boards hingedly connected with the forward portions of the front and rear seats, links pivotally connected at one end with the free edge portions of the heel boards and pivotally connected at their other ends with the end portions of the bars, a back hingedly mounted at the rear edge of the front seat, arms fixed in relation to the said hinged back, and having end portions disposed at the opposite side of the hinge from that side at which the back is located, and links pivotally connected at one end with the free ends of the arm, and pivotally connected at their other ends with intermediate portions of the bars and means carried by the hinged back for locking the same in a position at an angle to the level of the front seat, the upper end of said back being adapted to abut the lower edge of the rear heel board to form a bed, when the back is lowered, and the rear heel board raised into the plane of the seat.

In testimony whereof I affix my signature.

CARL HURST.